United States Patent

Macek

[15] 3,642,375
[45] Feb. 15, 1972

[54] OPTICAL COMBINER

[72] Inventor: Warren M. Macek, Huntington Station, N.Y.
[73] Assignee: Sperry Rand Corporation
[22] Filed: Oct. 2, 1969
[21] Appl. No.: 863,191

[52] U.S. Cl. .........................356/114, 356/106 LR, 250/199
[51] Int. Cl. ..........................................................G01n 21/40
[58] Field of Search.......................356/29, 5, 117, 106, 114; 250/199

[56] References Cited

UNITED STATES PATENTS

| | | | |
|---|---|---|---|
| 3,215,840 | 11/1965 | Buhrer | 250/199 |
| 3,482,107 | 12/1969 | Hock | 356/114 |
| 3,373,650 | 3/1968 | Killpatrick | 356/106 |
| 3,382,760 | 5/1968 | Macek | 356/106 |
| 3,463,924 | 8/1969 | Culshaw et al | 356/106 |

Primary Examiner—Rodney D. Bennett, Jr.
Assistant Examiner—S. C. Buczinski
Attorney—S. C. Yeaton

[57] ABSTRACT

Apparatus for determining the magnitude and sense of the frequency difference between two identically sensed circularly polarized light beams comprising a beam splitter and respective pairs of analyzers and photodetectors. The light beams impinge on the beam splitter such that the transmitted component of one beam and the reflected component of the other beam are directed through one analyzer onto a related photodetector while the reflected component of the one beam and the transmitted component of the other are directed through the other analyzer and its related photodetector, the transmission axes of the analyzers being angularly displaced relative to one another whereby electrical signals provided by the photodetectors are proportionately phase-shifted relative to one another.

7 Claims, 7 Drawing Figures

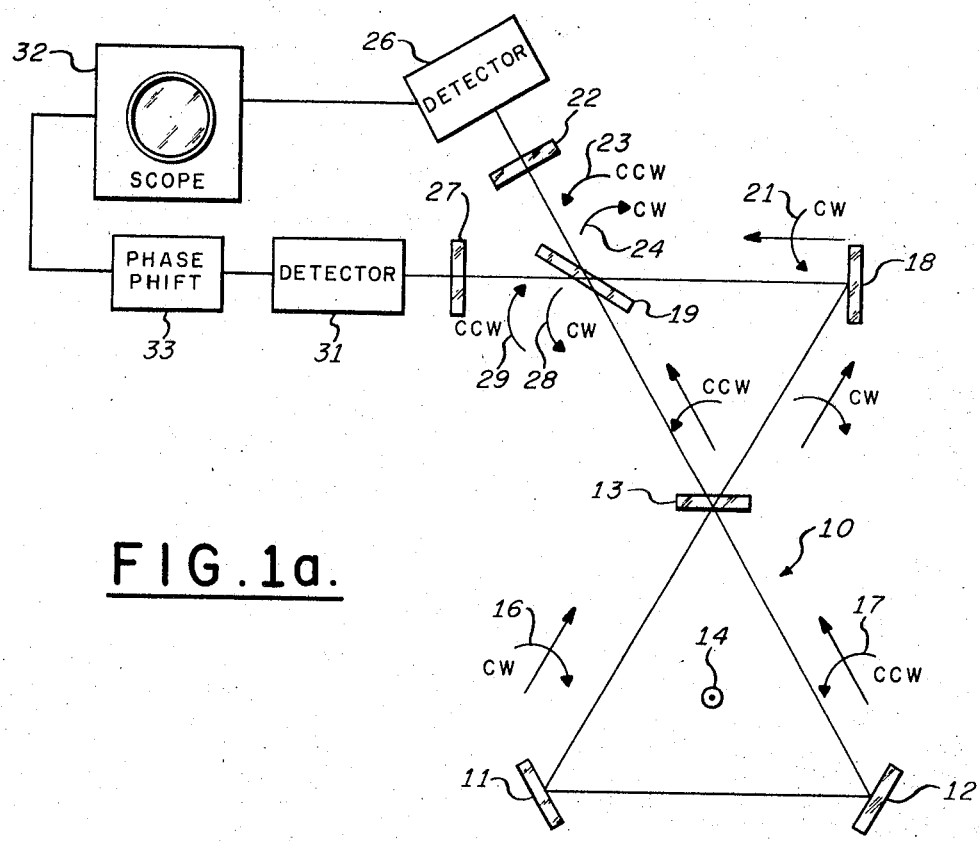
FIG.1a.
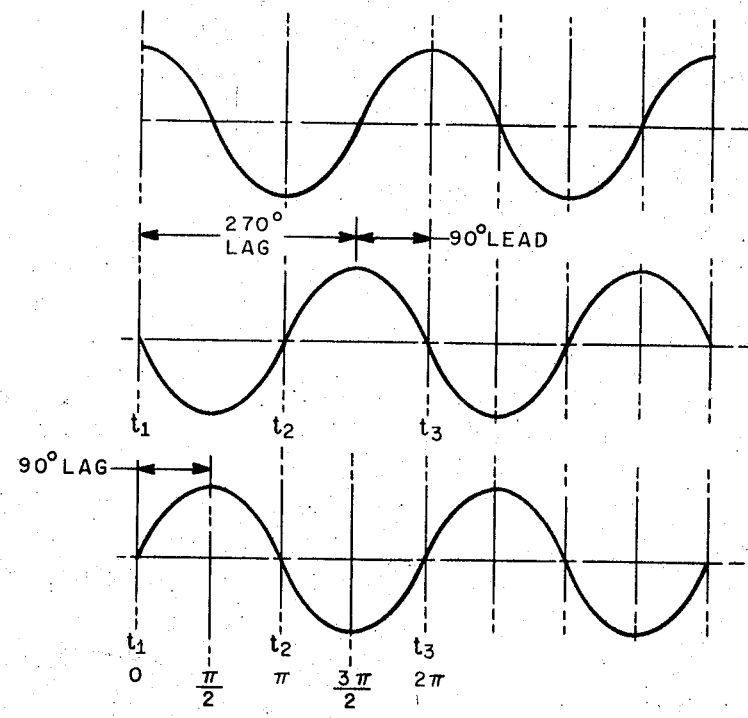
FIG.1b.
FIG.1c.
FIG.1d.
INVENTOR
WARREN M. MACEK
BY
*H.H. Terry*
ATTORNEY

INVENTOR
WARREN M. MACEK
BY
ATTORNEY

OPTICAL COMBINER

The invention herein described was made in the course of or under a contract, or subcontract thereof, with the Department of the Air Force.

BACKGROUND OF THE INVENTION

1. Field of the Invention

The present invention relates to optical combiners and more particularly to apparatus for combining two light beams in a manner to provide relative phase-shifted electrical signals having a frequency equal to the frequency difference between the two beams. From such signals both the magnitude and sense of the frequency difference can be readily determined as will become apparent from a reading of the subsequent detailed description of the preferred embodiment. Thus, the invention has utility in any system wherein data is represented by the difference between the frequencies of two light beams.

One example of an apparatus in which information is provided by the frequency difference between two beams is an optical Doppler radar wherein part of the energy in a transmitted beam is retained as a local oscillator signal to be mixed with that part of the transmitted beam which is reflected from a remote object. As is well known to those skilled in the radar art, the direction of the frequency shift of the reflected energy is indicative of the direction of motion of the remote object relative to the transmitter while the magnitude of the frequency difference is proportional to the velocity of the object relative to the transmitter. Another example of an apparatus in which information is provided by the frequency difference between two light beams is a ring laser wherein two beams are propagated in opposite directions around a closed-loop path. In this instance the sense of the frequency difference between the two beams, that is whether one is higher or lower in frequency than the other, is representative of the direction of rotation of the ring laser about an axis normal to the closed-loop path while the magnitude of the frequency difference is proportional to the rotational rate.

2. Description of the Prior Art

One prior art optical combiner which operates to provide phase shifted electrical signals representative to the direction of frequency shift between two light beams utilizes a beam splitter in combination with a pair of photodetectors disposed such that one photodetector receives the transmitted component of one beam and the reflected component of the other beam while the other photodetector receives the transmitted component of the other beam and the reflected component of the one beam. The beamsplitter is preferably a lossless mechanism comprising a metal or metallic-coated member so that the light components transmitted therethrough are phase-shifted relative to the reflected components with the result that each photodetector produces an electrical signal having a frequency equal to the frequency difference between the input beams incident on the beamsplitter and a phase determined by the phase between the reflected and transmitted components. The magnitude of the phase difference between the electrical signals is equal to twice the phase difference between the reflected and transmitted components at the beam splitter while the sense of the phase difference is determined by the sense of the frequency difference between the input beams, both the magnitude and sense of the phase difference being independent of the difference between the frequencies of the beams. Hence, the phase angle between the electrical signals is dependent solely on the difference in phase between the reflected and transmitted components at the beam splitter which in turn is determined by the thickness and conductivity of the metallic coating and the angle of incidence of the input beams. Thus, by judicious selection of the beam splitter characteristics the electrical signals provided by the photodetector can be arranged to have a predetermined phase relationship with one leading or lagging the other in accordance with the direction of the frequency difference between the input beams, that is depending on whether one beam is at a higher or lower frequency with respect to the other. Then by adding a predetermined phase shift to one of the electrical signals two distinguishable resultants can be produced. For instance, if the phase angle produced by the beamsplitter between the reflected and transmitted components is 45°, the phase angle between the electrical signals provided by the photodetectors will be 90° and then by adding a 90° phase shift to one of the signals the resultant will either be in phase or 180° out of phase in accordance with the sense of the frequency difference therebetween.

SUMMARY OF THE INVENTION

The present invention relates to an optical combiner adapted to operate on identically sensed circularly polarized light beams to provide phase-shifted electrical signals representative of the sense and magnitude of the difference in frequency between two input light beams incident on the combiner. It comprises a lossless beam splitter disposed relative to respective pairs of analyzers and photodetectors such that each input beam is partially transmitted through and partially reflected from the beam splitter with the transmitted component of one beam in collinear alignment with the reflected component of the other beam and likewise for the other components of each beam. Inasmuch as the sense of a circularly polarized wave is reversed upon reflection it will be appreciated that, upon emerging from the beam splitter, the beams incident on the analyzer each comprise two oppositely sensed circularly polarized waves which may be regarded as producing a resultant plane polarized wave rotating in the direction of the higher frequency circular polarized wave at a rate equal to half the difference between the frequencies of the input beams. The analyzers convert the resultant rotating plane polarized waves into nonrotating plane-polarized waves having a frequency equal to twice the rotational rate of the resultant plane-polarized wave incident thereon. Thus, each photodetector receives a plane-polarized wave varying in amplitude at a rate equal to the difference in frequency between the input beams incident on the beam splitter. The transmission axes of the analyzers are angularly displaced relative to one another by a predetermined amount thereby establishing a known phase shift between the signals provided at the photodetector outputs.

In one application of the invention described hereinafter two electrical signals having a predetermined phase shift therebetween are operated on to obtain an indication of the sense of the frequency difference between the input light beams. In another application the electrical signals are utilized to provide increased frequency resolution. For instance, where the photodetector signals are phase-shifted by 90° relative to one another, zero crossings or amplitude peaks occur twice as frequently as for a single signal. Since both signals have the same frequency, namely a frequency corresponding to the difference between the input beams entering the combiner, and the phase difference between them is known, the frequency can be determined in a time equal to one-quarter of a cycle. Thus, the frequency can be ascertained in less time or alternatively a plurality of frequency measurements can be made in a given time interval for the purpose of improving accuracy of the measurement.

BRIEF DESCRIPTION OF THE DRAWINGS

FIG. 1a is a simplified schematic drawing of the optical combiner of the present invention as used in an illustrative ring laser system for determining the sense of ring rotation.

FIGS. 1b, 1c, and 1d depict waveforms which are useful for explaining the operation of the apparatus shown in FIG. 1a.

FIG. 3b are waveforms of the phase relations provided by the apparatus of FIG. 3a.

DESCRIPTION OF THE PREFERRED EMBODIMENT

Figure 2:
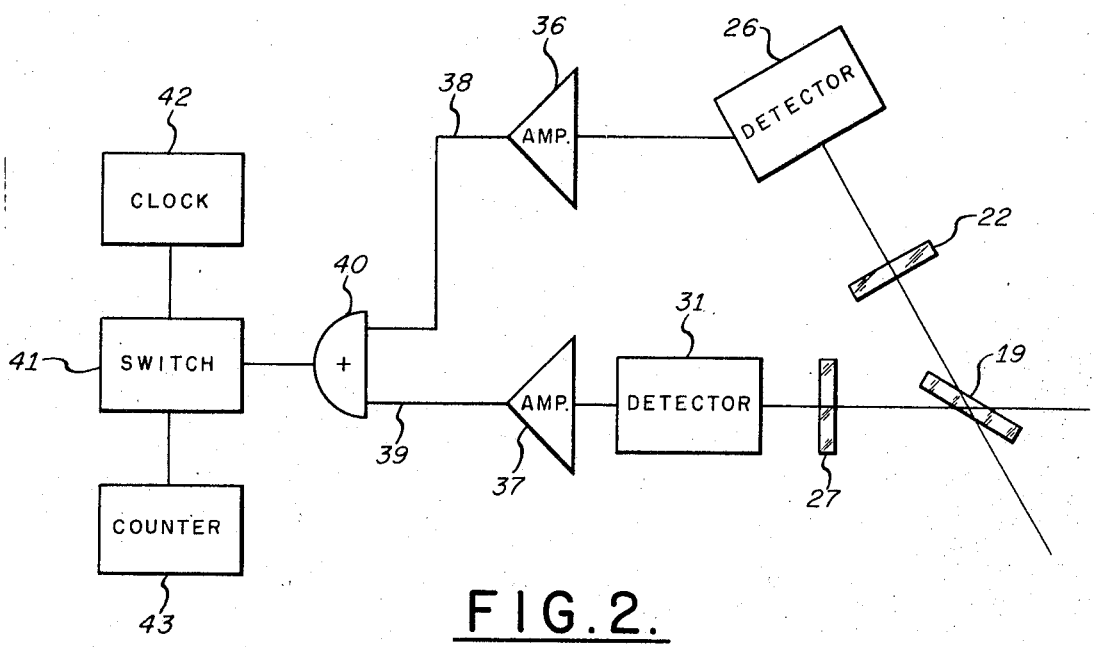
FIG. 2 is a simplified drawing of the frequency-measuring apparatus adapted to be used with the optical combiner for enhancing the resolution or accuracy of the frequency measurement.

Referring to FIG. 1, a closed-loop optical path 10 is defined by corner reflectors 11, 12, and 13. Two coherent light beams from an active lasing medium (not shown) located along path 10 propagate in opposite directions about the closed-loop optical path. The details of construction of such a ring laser are well established in the art and are omitted from the drawing to avoid unnecessary digression. The details of a suitable ring laser are shown for example in application Ser. No. 580,773, now U.S. Pat. No. 3,480,878 Ring Laser With Means For Reducing Coupling to Backscattered Rays, filed Sept. 20, 1966, in the name of the present inventor and assigned to the present assignee.

Each of the contradirectional beams propagating in the ring returns to a given starting point after a short but measurable interval of time required to traverse the path at the finite velocity of light. As the optical path is caused to rotate about axis 14 which is perpendicular to the plane of the path, the light beam traveling in the same direction as the rotation travels an effective path length which is lengthened by the distance that the assumed starting point moves while the beam completes a traversal of the path. Conversely, the beam of light traveling in the direction opposite to the path rotation travels a shorter effective path length in completing a traversal of the loop. The difference between the effective path lengths produces a frequency difference between the contradirectional beams proportional to the path rotational velocity about axis 14. As explained in the aforementioned patent, the contradirectional beams may have oppositely sensed circular polarizations as indicated in FIG. 1 of this application by arrows 16 and 17 relating respectively to the clockwise- and counterclockwise-propagating beams. As is well known, a circular polarized beam may be represented by a rotating plane-polarized vector, and in accordance with conventional practice the sense of the circular polarization is indicated as right or left by arrows similar directed as viewed against the direction of light propagation. Thus, the illustrated clockwise (CW) beam is left circularly polarized while the counterclockwise (CCW) beam is right circularly polarized.

A small part of the energy in each of the contradirectional beams is extracted from closed optical path 10 through corner mirror 13 which is partially transmissive. The clockwise beam upon exiting from mirror 13 impinges on mirror 18 from which it is reflected toward beam splitter 19 with the opposite sense of circular polarization as indicated by arrow 21. At the same time the counterclockwise beam upon exiting from mirror 13 propagates directly onto the beamsplitter 19 and retains its original sense of right circular polarization. It is therefore seen that the extracted components of the clockwise and counterclockwise beams incident on beam splitter 19 are identically circularly polarized. It should be understood that various mirror configurations can be used in conjunction with the beam splitter for establishing the desired circular polarization sense of the beams incident thereon and further that quarter-wave plates can be used to provide the circular polarization in the event the beams are initially plane polarized. The beam splitter operates to transmit half the energy in each beam and to reflect the other half. Hence, analyzer 22 receives a composite beam including the transmitted component of the counterclockwise beam and the reflected component of the clockwise beam, the counterclockwise beam retaining its right circular polarization sense as indicated by arrow 23 while the polarization sense of the clockwise beam is reversed to left circular polarization as indicated by arrow 24. These oppositely sensed beams constitute a resultant plane polarized beam rotating at a rate equal to one-half the frequency difference between the respective beams which, as explained hereinbefore and in the aforementioned patent, is proportional to the rotational rate of the closed optical path. Analyzer 22 converts the resultant rotating plane-polarized wave into a nonrotating plane-polarized wave having a cyclic rate of amplitude variation equal to the frequency difference between the clockwise and counterclockwise beams. The result obtains since the analyzer responds to the resultant rotating plane polarized beam in such a way that the beam exiting from the analyzer is a maximum each time the polarization is aligned with the transmission axis of the analyzer and a minimum when orthogonal thereto, which occurs twice for each 360° of rotation. The plane-polarized beam emerging from the analyzer is directed onto detector 26 wherein it is converted to an equivalent electrical signal having a phase determined by the orientation of the analyzer as will be explained subsequently in greater detail.

In a similar manner analyzer 27 receives a composite beam including the transmitted component of the clockwise beam and the reflected component of the counterclockwise beam. In this instance the clockwise beam retains the right circular polarization sense it had upon striking beam splitter 19, as indicated by arrow 28, while the polarization sense of the counterclockwise beam is reversed to left circular polarization indicated by arrow 29. As a consequence of the reversal of the polarization sense accompanying the reflected components of the clockwise and counterclockwise beams, it will be noted that the polarization sense of the resultant beams impinging on the analyzers are reversed with respect to one another, that is, the clockwise beam is left circularly polarized at analyzer 22 and right circularly polarized at analyzer 27 and conversely regarding the counterclockwise beam. Analyzer 27 operates in substantially the same manner as analyzer 22 thereby providing a plane-polarized beam for incidence on photodetector 31 which converts the beam to an equivalent electrical signal having the same frequency but a different phase from the signal provided at the output of photodetector 26. This phase difference is achieved by angularly displacing the transmission axis of analyzer 27 relative to the transmission axis of analyzer 22. For instance, assume the transmission axis of analyzer 22 is vertically oriented and that the transmission axis of analyzer 27 is displaced 45° from the vertical in a clockwise direction as viewed from the position of beamsplitter 19. Now if the clockwise wave propagating in the ring is at a higher frequency than the counterclockwise wave the resultant rotating plane-polarized wave incident on analyzer 22 will have a left circular polarization sense, that is, it will appear to rotate in a clockwise direction as viewed from the beam splitter or counterclockwise as viewed from detector 26. Accordingly, when this resultant beam is vertically oriented, the light transmitted through analyzer 22 will be a maximum as indicated at $t_1$ in FIG. 1b, reach a minimum at $t_2$ when the beam is horizontally oriented, then return to a maximum at $t_3$ when the beam is vertically oriented again, and so on with two maxima and two minima occurring for each revolution of the resultant rotating plane-polarized beam.

The same operation obtains for the beams incident on analyzer 27 except that the beam transmitted therethrough is phase shifted with respect to the beam transmitted through analyzer 22 as a result of the angular displacement between the transmission axes of the analyzers. Moreover, in this case, for the assumed condition of the clockwise-propagating wave being at a higher frequency than the counterclockwise wave, the resultant rotating plane-polarized wave incident on analyzer 27 will rotate in the counterclockwise direction as viewed from the beamsplitter. Consequently, the beam transmitted through analyzer 27 lags that transmitted through analyzer 22 by 270° as indicated in FIG. 1c. This is equivalent to a phase lead of 90° as is readily discernible from FIGS. 1b and 1c. That this condition obtains can be readily appreciated by recognizing that if both of the resultant rotating plane-polarized beams incident on the analyzers are initially oriented vertically upward, then the beam transmitted through analyzer 22 will start at a maximum whereas the beam transmitted through analyzer 27 will not reach a maximum until the resultant beam incident thereon has rotated through 135°. Since the phase shift is equal to twice the angular displacement between the analyzers, the beams emerging therefrom are seen to be phase-shifted by 270°.

If on the other hand the counterclockwise wave propagating in the ring has a higher frequency than the CW wave, the resultant rotating plane-polarized wave incident on analyzer 22 will have a right circular polarization sense while that indicent on analyzer 27 will have a left circular polarized sense. Then for the previously mentioned orientation of the analyzer transmission axes the cyclic variation of the light impinging on photodetector 26 will have the same phase as indicated in FIG. 1b while the phase of the light falling on photodetector 31 will be shifted as indicated in FIG. 1d, namely, lagging the signal at photodetector 26 by 90°. Accordingly, the electrical signals provided by the output of photodetectors 26 and 31 have a relative phase shift of plus or minus 90° with the direction of the phase shift being dependent on which of the two beams incident on beamsplitter 19 is at a higher frequency. These 90° phase relations are easily converted into two readily distinguishable phase shifts such as zero degrees and 180° by connecting photodetector 26 directly to the horizontal deflection control terminal of oscilloscope 32 while photodetector 31 is connected through 90° phase shift circuit 33 (either lead or lag) to the vertical deflection control terminal of the oscilloscope whereby one of two oppositely sloped lines will be presented on the viewing face of the scope representative of the sense of the frequency difference between the contradirectional waves propagating in the closed-loop path of the ring laser.

In FIG. 2 the optical combiner comprising beam splitter 19, analyzers 22 and 27 and photodetectors 26 and 31 is identical to that shown in FIG. 1a. The detector output signals are utilized in a different manner, however, for improving the resolution of the frequency measurement. For this purpose photodetectors 26 and 31 are connected to amplifiers 36 and 37 respectively, which operate in a saturated mode and thereby provide amplitude-clipped output signals having substantially zero rise and decay times and precisely determined zero or average crossing points. The amplifier output terminals are coupled on leads 38 and 39 to the input of OR-circuit 40 whereupon the first positive-going zero-crossing signal provided from either amplifier actuates switch 41 causing it to close and enable pulses to be gated therethrough from clock 42 into counter 43 until the next positive going zero crossing signal arrives through the OR-circuit causing switch 41 to open and thereby terminate the count. Thus, if the clock produces a precise number of pulses in a known time interval the frequency of the difference signal provided at the output of photodetectors 26 and 31 can be obtained simply by counting the number of such pulses which occur in the interval between two successive zero crossings. Since these zero crossings are known to be spaced by one-quarter of a cycle, for the condition where the analyzer transmission axis are angularly displaced by 45°, the frequency can be readily calculated. For example, if the clock frequency is 1 megacycle per second and 500,000 pulses (corresponding to one-half second) are measured in the one-quarter cycle interval, the difference frequency is one-half cycle per second. Hence, instead of having to wait 2 seconds for one complete cycle to occur in order to ascertain the frequency, it is possible by the use of the aforedescribed technique to determine the frequency in only one-half second. Alternatively, the counter could be cleared at the end of every second zero crossing and a new count made with a total of four counts being made in 2 seconds for a signal having a frequency of one-half cycle per second, thereby enabling the four counts to be averaged so as to enhance the accuracy of the measurement.

Figure 3A:
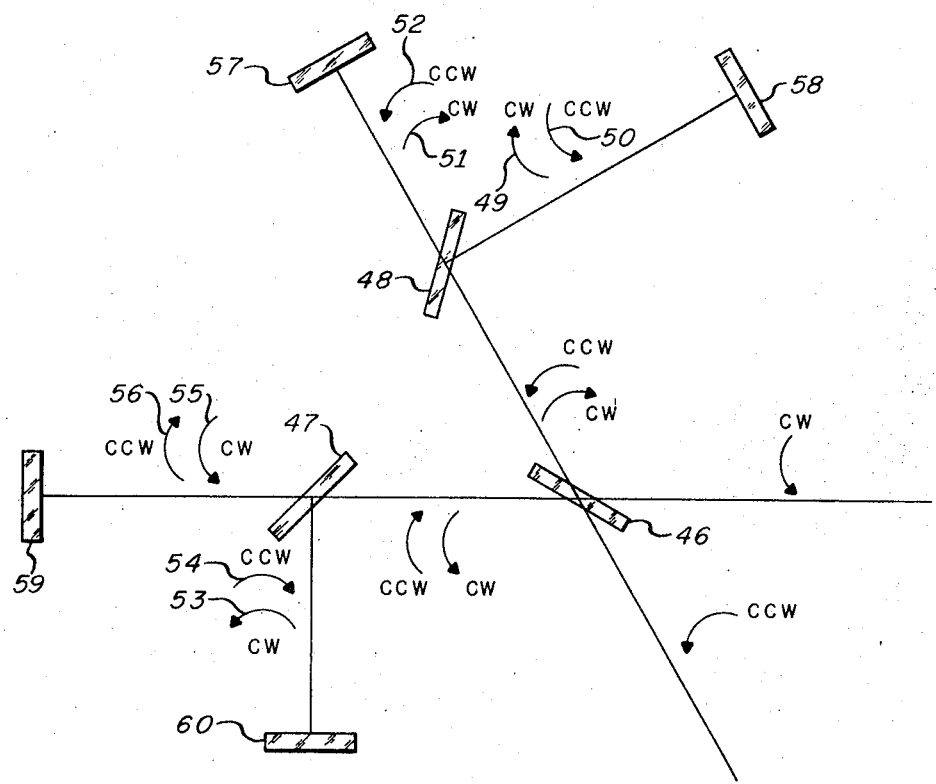
FIG. 3a is a simplified schematic illustration of an alternate combiner mechanism for providing increased frequency resolution.
Figure 3B:
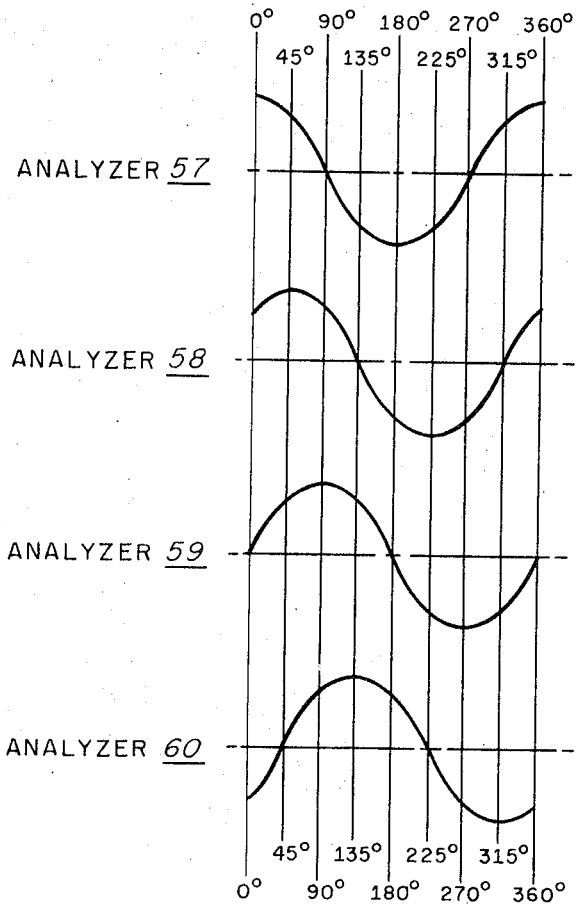

It should be noted that this technique can be modified by arranging the transmission axis of the two analyzers so that two successive zero crossings are spaced for instance by only 10° or even less if desired. This spacing will be obtained, however, only between the first and second, third and fourth, fifth and sixth zero crossings and so on. Between the second and third, fourth and fifth, sixth and seventh, etc., zero crossings the spacing will be considerably larger. A multiplicity of uniform small increments can be obtained by arranging additional beam splitters in cascaded fashion with the input beam splitter so that both input beams after first being partially transmitted and reflected from the input beam splitter are then reflected and transmitted from the additional beam splitters disposed in their respective paths, each beam splitter operating in conjunction with associated analyzers and photodetectors and each analyzer being angularly displaced from the other analyzers. An OR circuit can be employed to commence a count upon the occurrence of any zero crossing signal and terminate the count upon the occurrence of the next zero-crossing signal and so on as explained with reference to FIG. 2. Thus, referring to FIG. 3a, the beams obtained from input beam splitter 46 are applied to beam splitters 47 and 48. For the indicated sense of circular polarization of the light beams derived from beam splitter 46, designated CW and CCW in conformance with the apparatus hereinbefore described, the CW and CCW beams reflected from beam splitter 48 are respectively right and left circularly polarized as indicated by arrows 49 and 50 while the fraction of the corresponding beams transmitted therethrough are respectively left and right circularly polarized as indicated by arrows 51 and 52. Likewise, the CW and CCW beams reflected from beam splitter 47 are respectively left and right circularly polarized as indicated by arrows 53 and 54 while the corresponding fractional components transmitted through beamsplitter 47 are respectively right and left circularly polarized as indicated by arrows 55 and 56. Analyzers 57, 58, 59, and 60 are oriented with their transmission axes respectively vertical, 22.5° to the left of vertical, 45° to the right of vertical, and 67.5° to the left of vertical as viewed in the direction of the beams incident thereon. Now, if the CW beam is assumed to be at a higher frequency than the CCW beam, the light beams at the output of the analyzers will have the respective phases shown in FIG. 3b. It is therefore seen that zero crossings occur every 45°, and the frequency measurement resolution is correspondingly enhanced. Obviously this technique could be extended by using as many beamsplitters as required to provide the desired resolution enhancement.

I claim:

1. An optical combiner adapted to receive two identically sensed circularly polarized light beams for producing phase-shifted electrical signals having a frequency proportional to the frequency difference between said two light beams and relative phase representative of the sense of the frequency difference therebetween, said apparatus comprising first and second optical analyzers arranged such that the transmission axis of the first analyzer is angularly displaced from the transmission axis of the second analyzer, beam splitter means disposed in the path of said circularly polarized light beams for partially transmitting and partially reflecting each beam such that at least part of the energy in both a reflected component of one beam and a transmitted component of the other beam is applied to the first analyzer and at least part of the energy in both a transmitted component of said one beam and a reflected component of said other beam is applied to the second analyzer, a first optical frequency mixer positioned to receive the light signal transmitted through the first analyzer and a second optical frequency mixer positioned to receive the light signal transmitted through the second analyzer, said optical frequency mixers being operative to convert the light signals incident thereon to equivalent electrical signals phase shifted relative to one another in proportion to the angular displacement between the transmission axes of the analyzers, means responsive to said electrical signals for determining the occurrence of zero crossings thereof and providing timing signals corresponding to said zero crossings, and means responsive to a timing signal corresponding to a zero crossing of the electrical signal derived from the first optical frequency mixer and further responsive to a timing signal corresponding to a zero crossing of the electrical signal derived from the second optical frequency mixer for determining the time interval between said timing signals.

2. The apparatus of claim 1 wherein said time interval determining means includes a clock pulse source, switching means connected to the clock pulse source, said switching means being responsive to said timing signals derived from the first and second optical frequency mixers for closing and opening said switching means, and a counter coupled to said switching means to receive clock pulses transmitted therethrough during the interval when said switching means is closed.

3. An optical system for operating on two identically sensed circularly polarized input light beams to produce phase-shifted electrical signals having a frequency proportional to the frequency difference between the two input beams and a relative phase representative of the sense of the frequency difference therebetween, said system comprising means for providing a pair of identically sensed circularly polarized input light beams, beam splitter means disposed in the path of the circularly polarized input beams for partially transmitting and partially reflecting each beam to produce first and second composite beams each containing a component of both input beams, the polarization sense of the transmitted components being retained while the polarization sense of the reflected parts is reversed whereby the respective transmitted and reflected components of each composite beam are of opposite circular polarization sense relative to one another, first and second optical analyzers positioned in the path of the first and second composite beams respectively, the transmission axes of said analyzers being angularly displaced relative to one another whereby, under a condition where said input beams are at different frequencies, the plane-polarized beams transmitted through the analyzers are amplitude modulated and phase shifted relative to one another and the frequency of the amplitude modulated beams is proportional to the frequency difference between the input beams, first and second optical frequency mixers positioned to receive the amplitude-modulated plane-polarized beams transmitted through said first and second analyzers respectively and convert said plane-polarized beams to equivalent electrical signals phase shifted relative to one another in proportion to the angular displacement between the transmission axes of said analyzers.

4. The apparatus of claim 3 further including first additional beam splitter means disposed in the path of the composite beams directed from said beam splitter means to said first analyzer, and second additional beam splitter means disposed in the path of the composite beams directed from said beam splitter means to said second analyzer, said first additional beam splitter means being operative to direct part of the light incident thereon to said first analyzer and part to a third analyzer, said second additional beam splitter means being operative to direct part of the light incident thereon to said second analyzer and part to a fourth analyzer, and said third and fourth analyzers being oriented with their transmission axes angularly displaced relative to both one another and said first and second analyzers.

5. The apparatus of claim 3 including an electrical phase shift device connected to the output of one of said optical frequency mixers to impart a predetermined phase shift to the signal provided therefrom.

6. The apparatus of claim 5 wherein the transmission axis of said first analyzer is angularly displaced from the transmission axis of said second analyzer by 45°.

7. The apparatus of claim 8 wherein said beam splitter means is oriented in the path of said two circularly polarized beams such that the reflected and transmitted beam components directed to the first analyzer are collinearly aligned, and likewise for the transmitted and reflected beam components directed to the second analyzer.

* * * * *